United States Patent [19]
Demar et al.

[11] Patent Number: 5,496,972
[45] Date of Patent: Mar. 5, 1996

[54] ARTICULATING WEIGHING SCALE PLATFORM

[75] Inventors: David A. Demar, Trumbull; Thomas J. Pendleton, Danbury; Sandor F. Weisz, Stamford, all of Conn.

[73] Assignee: Pitney Bowes Inc., Stamford, Conn.

[21] Appl. No.: 129,931

[22] Filed: Sep. 17, 1993

[51] Int. Cl.⁶ .......................... G01G 21/00; G01G 21/22
[52] U.S. Cl. .............................................. 177/126; 177/262
[58] Field of Search .................................. 177/124, 126, 177/262; 40/120, 152.1, 642

[56] References Cited

U.S. PATENT DOCUMENTS

| | | | |
|---|---|---|---|
| 3,305,206 | 2/1967 | Nichols | 40/120 X |
| 4,120,371 | 10/1978 | Zohn et al. | 177/262 |
| 4,368,791 | 1/1983 | Jackson | 177/126 |
| 5,254,812 | 10/1993 | Hilford | 177/262 |
| 5,307,281 | 4/1994 | Wollmann | 364/464.03 |

Primary Examiner—Peter S. Wong
Assistant Examiner—Randy W. Gibson
Attorney, Agent, or Firm—Robert H. Whisker; Melvin J. Scolnick

[57] ABSTRACT

A weigh scale platform having a first, closed position providing a horizontal weighing surface and a second, open position for supporting flats in a substantially vertical orientation. The platform includes a base and first and second portions supported by the base. The first and second portions are horizontal and co-planar in the first position and are connected by a first hinge. The second portion is connected to the rear edge of the base by a second hinge. In the second position the first portion rotates about the first hinge to a substantial vertical orientation and is closed in place. The second portion rotates around the second hinge to support the first portion. The base also includes a ridge and a channel to support and restrain the lower edge of a vertically supported flat.

9 Claims, 1 Drawing Sheet

ARTICULATING WEIGHING SCALE PLATFORM

BACKGROUND OF THE INVENTION

This invention relates to weighing scale platforms. Particularly, it relates to platforms which facilitate weighing of oversize envelopes and the like (sometimes hereinafter referred to as flats) on a small sized scale.

Postal scales, which typically employ load cell transducers, are being contained in smaller housings due to the advancements of digital electronic technology. In order to facilitate the weighing of oversized envelopes which overhang the platform, possibly obscuring the keyboard, or increasing the weighing time as the unsupported portion vibrates, platform stands have been used to receive the envelope in a vertical orientation for weighing. Removal of the platform stand is required to receive items for weighing, such as, packages or box like items. An example of such a platform stand is of the type disclosed in U.S. Pat. No. 5,050,694. This patent discloses an adjustable stand which comprises an upright envelope support which extends across the platform. In order to accommodate the weighing of packages, the stand must be manually removed from the platform. This can prove to be cumbersome and time consuming to operate when desiring to continuously weigh envelopes and packages which are not sorted. Additionally, the stand is an accessory component which will require storage space when not in use and is subject to being misplaced.

Thus, it is object of the subject invention to provide a scale platform which facilitates weighing of oversize envelopes and the like while retaining the capability to support packages and box like items.

BRIEF SUMMARY OF THE INVENTION

The above object is achieved and the disadvantages of the prior art are overcome in accordance with the subject invention by a weigh scale platform which includes first and second portions and a hinge connecting the two portions. In a first position the first and second portions are horizontal and co-planar and form a horizontal surface for supporting packages or box like objects to be weighted. In a second position the first portion is rotated about the hinge to form a substantially vertical support for flats.

In accordance with one aspect of the subject invention the platform also includes a platform base and the second portion of the platform is connected to the base by a second hinge and the second portion is rotated around the second hinge in the second position to form a support for the first portion.

In accordance with another aspect of the subject invention the platform base has a ridge adjacent and parallel to an edge of the first portion and forming a part of the horizontal surface in the first position of the platform; the edge and ridge being separated from and parallel to the axis of the first hinge. The platform base also includes a channel adjacent and parallel to the ridge and beneath the first portion. As the first portion is rotated around the first hinge, the first edge moves across the channel and away from the ridge and the lower edge of a flat vertically supported by the first portion nests in the channel and is restrained by the ridge.

Thus, it can be seen that the above object is advantageously achieved by the subject invention. Other objects and advantages will be apparent to those skilled in the art from consideration of the attached drawings and the detailed description set forth below.

DETAILED DESCRIPTION OF THE INVENTION

Figure 1:
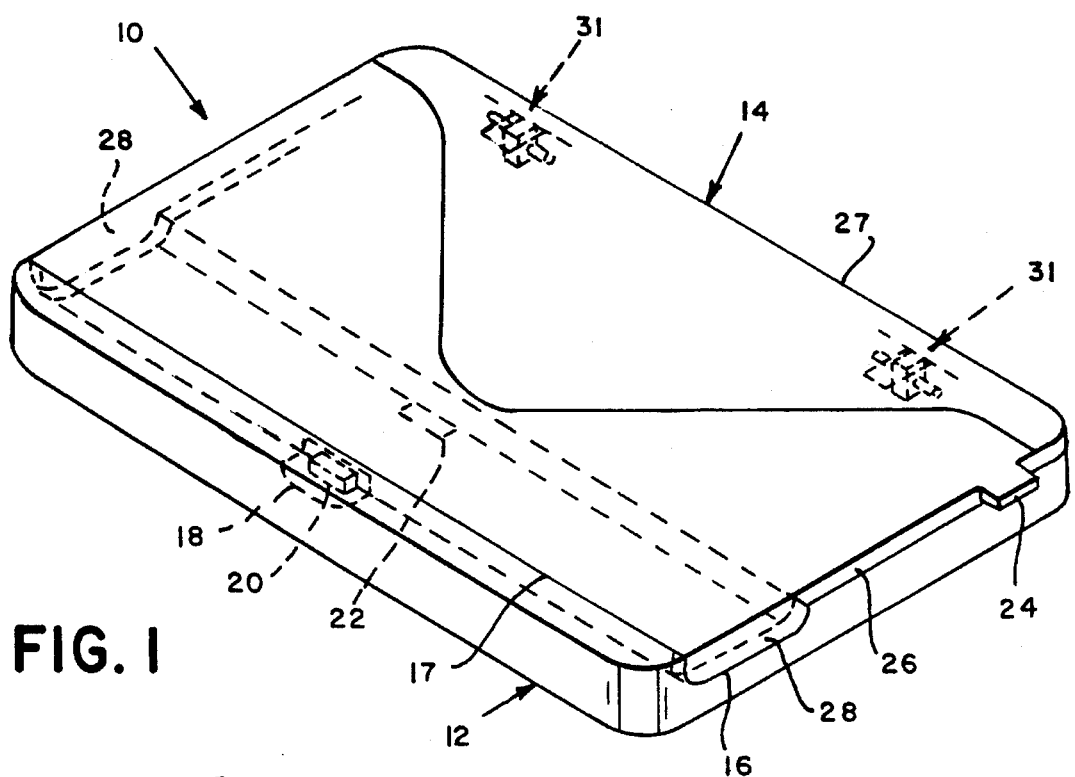
FIG. 1 shows a perspective view of the weigh scale platform of the subject invention in a first, closed position.
Figure 2:
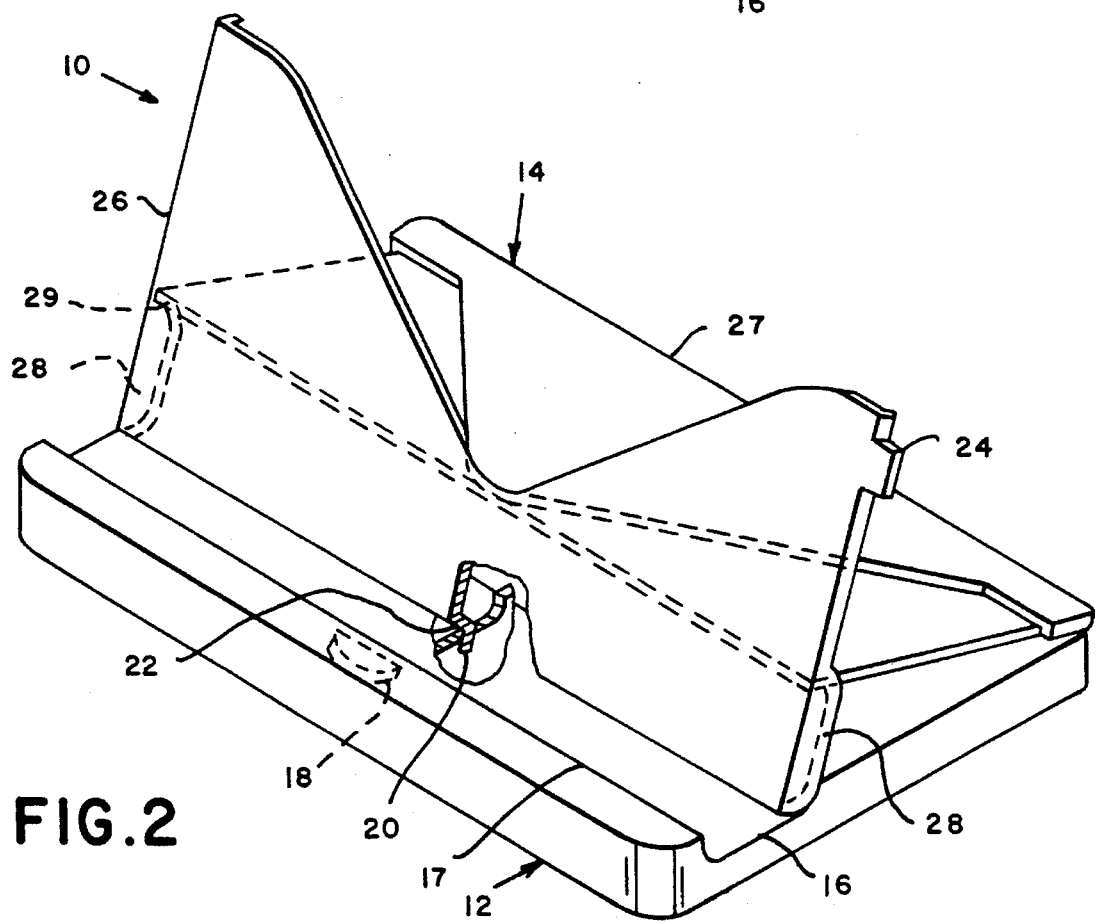
FIG. 2 shows a perspective view of the weigh scale platform of the subject invention in a second, open position.

Referring to FIGS. 1 and 2, articulating weigh scale platform 10 is depicted in both the closed position and open position, respectively, for weighing of objects. As shown in FIG. 1, the closed position is preferably used for receiving packages for weighing. The open position depicted in FIG. 2, is preferably used to receive envelopes, sheet-like items, ore relatively thin, flat items which may vary in size.

Articulating weigh scale platform 10 is adapted for use with any conventional postal rate scale. (not shown) Such scales are readily available from Pitney Bowes Inc., Stamford, Conn., 06926-0700. Articulating weigh scale platform 10 is provided with a conventional four prong hookup (not shown) on its underside preferably centrally located in order to attach platform 10 to a scale in a conventional manner. This enables the use of a scale with a small footprint to weigh envelopes and packages of a variety of sizes. The platform 10 is construed of any suitable material which is capable of providing somewhat rigid support and capable of maintaining its original configuration. A molded plastic, such as polypropylene, preferably is used to form the platform 10. However, other materials such as metal, may also prove to be suitable.

The articulating weigh scale platform 10 is formed by a platform base 12. Stand 14 is connected to platform base 12 by hinges 31. The platform base 12 has a channel 16 near its frontmost edge. The channel 16 is sufficiently deep to create an envelope receiving area for accommodating envelopes placed on edge when vertically supported by first portion 26 in the second, open position. Channel 16 extends parallel to the front of the platform base 12. A ridge 17 is formed at the frontmost edge of the channel 16 in order to restrict movement of the lower edge of an envelope (not shown) when being supported by two-position platform support stand 14 while in the open position. A pocket recess 18 is formed about midway in ridge 17 for housing locking tab 20 when platform 10 is in the closed position. Across from the pocket recess 18 in the floor portion of channel 16 is locking recess 22, which temporarily locks locking table 20 in place when two-position platform support stand 14 is in the open position.

The two-position platform support stand 14 is manually adjusted between the open and closed positions by lifting tab 24 upward. Two-position platform support stand 14 is formed by first portion 26 which is pivotally mounted to second portion 27 to hinge 29. A "living hinge" can be used for hinge 29. For example, when constructing the platform 10 out of polypropylene, a living hinge can be formed by merely cutting part way into the material across the desired pivot line. However, it is contemplated that, in place of a living hinge, any other suitable hinge fastener may be implemented. Particularly, if high usage rates which might fatigue a living hinge are expected a conventional pin and detent hinge can be readily formed into portions 26 and 27.

At the centermost portion of the leading edge of first portion 26 is located locking tab 20 which temporarily locks the first portion 26 in a tilted or upright position when engaging with locking recess 22. In order to unlock support stand 14, an upward and slightly backward lifting of tab 24 is made. As locking tab 20 disengages with locking recess 22, locking tab 20 can slide across channel 16 and move into pocket recess 18 as support stand 14 enters into the closed position.

As can be seen in FIG. 2, as first portion 26 is raised into the second, open position portion 27 rotates away from base 12 around hinges 31 to provide support for portion 26.

When in the closed position, it is preferable that first portion 26 overlaps with second portion 27. When in the second open position, the overlapping portion of the first portion 26 provides a maximum retrieval support for articles to be weighed to be the length of the distance from the frontal edge of the first portion 26 to the rear edge of the scale platform. In order to provide a smooth surface on platform 10 for receiving packages in the closed position, the thickness of the overlapping area between first portion 26 and second portion 27 should be preferably one half the thickness which is dimensioned for the non-overlap areas which form support stand 14. Additionally, in order to maintain level support of the first portion 26 when in the closed position, first portion 26 preferably includes laterally positioned spaced apart supports 28. Supports 28 are configured to mate with the configuration of channel 16 when support stand 14 is in the closed position.

It will be apparent that variations and modifications may be made in the subject invention and it is therefore intended in the following claims to cover each such variation and modification as falls within the time spirit and scope of the invention.

What is claimed is:

1. A weigh scale platform, comprising:

(a) a first portion;

(b) a second portion;

(c) a first hinge connecting said first portion and said second portion;

(d) said first portion and said second portion being horizontal and co-planar in a first, closed position to form a horizontal surface for supporting objects to be weighed;

(e) said first portion is rotatable about said first hinge to a second, open position for supporting an oversized object to be weighed in a substantially vertical orientation; and (f) a platform base supporting said first and second portions, wherein said second portion is connected to said scale base by a second hinge, wherein said second portion rotates about said second hinge to support said first portion in said second position.

2. A weigh scale platform as described in claim 1, wherein said platform base further comprises:

(a) a ridge adjacent and parallel to an edge of said first portion in said first position, said edge and said ridge being spaced from and parallel to the axis of said first hinge;

(b) a channel adjacent and parallel to said ridge and beneath said first portion; and wherein, (c) as said first portion rotates about said first hinge said edge moves away from said ridge and across said channel, and the lower edge of a flat supported by said first portion in said second position rests in said channel and is restrained by said ridge.

3. A weigh scale platform as described in claim 2, further comprising;

a) means for securing said first portion to said channel to lock said first portion in said second position.

4. A weigh scale platform as described in claim 1, wherein, said first hinge traverses the underside of said first portion.

5. A weigh scale platform as described in claim 1, wherein said platform is composed of polypropylene.

6. A weigh scale platform as described in claim 1, wherein a part of said first portion extends beyond said first hinge and overlaps said second portion.

7. A weigh scale platform as described in claim 6 wherein said first portion provides a longer vertical support for supporting objects to be weighed in said second position.

8. A weigh scale platform as described in claim 2 wherein said first portion further comprises supports mating with the configuration of said channel to support said first portion in said first, closed position.

9. A weigh scale platform as described in claim 2, further comprising;

a) locking tab, said locking table located on said edge of said first portion, and, b) locking recess, said locking recess located on said ridge to mate with said locking tab.

* * * * *